United States Patent
Wen et al.

(10) Patent No.: US 7,149,732 B2
(45) Date of Patent: Dec. 12, 2006

(54) CLUSTERING WEB QUERIES

(75) Inventors: Ji-Rong Wen, Beijing (CN); Jian-Yun Nie, Beijing (CN); Ming-Jing Li, Beijing (CN); Hong-Jiang Zhang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 654 days.

(21) Appl. No.: 09/977,171

(22) Filed: Oct. 12, 2001

(65) Prior Publication Data
US 2003/0144994 A1 Jul. 31, 2003

(51) Int. Cl.
*G06F 17/30* (2006.01)

(52) U.S. Cl. .................. 707/4; 707/2; 707/7; 707/8; 707/9; 707/10

(58) Field of Classification Search ............... 707/1–10, 707/200–206, 100–104.1
See application file for complete search history.

(56) References Cited

U.S. PATENT DOCUMENTS

| | | | |
|---|---|---|---|
| 5,787,422 A * | 7/1998 | Tukey et al. .................. 707/5 |
| 5,864,845 A * | 1/1999 | Voorhees et al. .............. 707/5 |
| 6,128,613 A | 10/2000 | Wong et al. | |
| 6,701,309 B1 | 3/2004 | Beeferman et al. | |
| 6,856,957 B1 | 2/2005 | Dumoulin | |
| 6,886,010 B1 | 4/2005 | Kostoff | |
| 6,925,433 B1 | 8/2005 | Stensmo | |
| 2002/0099701 A1 | 7/2002 | Rippich | |
| 2002/0133726 A1 | 9/2002 | Kawamae | |
| 2003/0004968 A1 | 1/2003 | Romer et al. | |
| 2004/0220925 A1 | 11/2004 | Liu et al. | |
| 2004/0243568 A1 | 12/2004 | Wang et al. | |

OTHER PUBLICATIONS

M. Ester, H. Kriegel, J. Sander and X. Xu. A density-based algorithm for discovering clusters in large spatial database with noise. Proc. $2^{nd}$ Int. Conf. on Knowledge Discovery and Data Mining. Portland, OR. 1996, pp. 226-231.

M. Ester, H. Kriegel, J. Sander, M. Wimmer and X. Xu. Incremental clustering for mining in a data warehousing environment. Proc. of the $24^{th}$ VLDB Conf. New York, USA, 1998.

D. Gusfield. Algorithms on strings, trees, and sequences: computer science and computational biology, Part III. "Inexact matching, sequence alignment, and dynamic programming". Press of Cambridge university. 1997.

V.A. Kulunkin, K.J. Hammond and R.D. Burke. Answering questions for an organization online, Proc. of AAAI'98, 1998.

(Continued)

*Primary Examiner*—Jean M. Corrielus
*Assistant Examiner*—Isaac M. Woo
(74) *Attorney, Agent, or Firm*—Lee & Hayes, PLLC

(57) ABSTRACT

The described subject matter provides systems and procedures to make query similarity determinations, wherein the queries are used in information retrieval operations. A same document and/or multiple similar documents are identified that have been selected by a user in response to multiple queries. Responsive to identifying the same document and/or the similar documents, a query cluster is generated that indicates that the queries used to obtain the same and/or similar documents. This is accomplished in a manner that is independent of whether individual ones of the queries are compositionally similar with respect to other ones of the queries.

21 Claims, 3 Drawing Sheets

OTHER PUBLICATIONS

D.D. Lewis and W.B. Croft. Term clustering of syntactic phrases, ACM-SIGIR, pp. 385-404, 1990.

G. Miller (Ed.) Wordnet: an on-line lexical database. International Journal of Lexicography. 1990.

S.E. Robertson, M.E. Maron and W.S. Cooper. Probability of relevance: a unification of two competing models for document retrieval. Information Technology: Research and Development, 1(1-21). 1982.

M. Porter. An algorithm for suffix stripping. Program, vol. 14(3), pp. 130137, 1980.

R, Srihari and W. Li. Information extraction supported question answering. Proc. of TREC8, pp. 75-85, 1999.

C.J. van Rijsbergen. Information Retrieval, Information Retrieval. Butterworths, 1979.

Fitzpatrick et al, Automatic Feedback Using Past Queries: Social Searching ?

\* cited by examiner

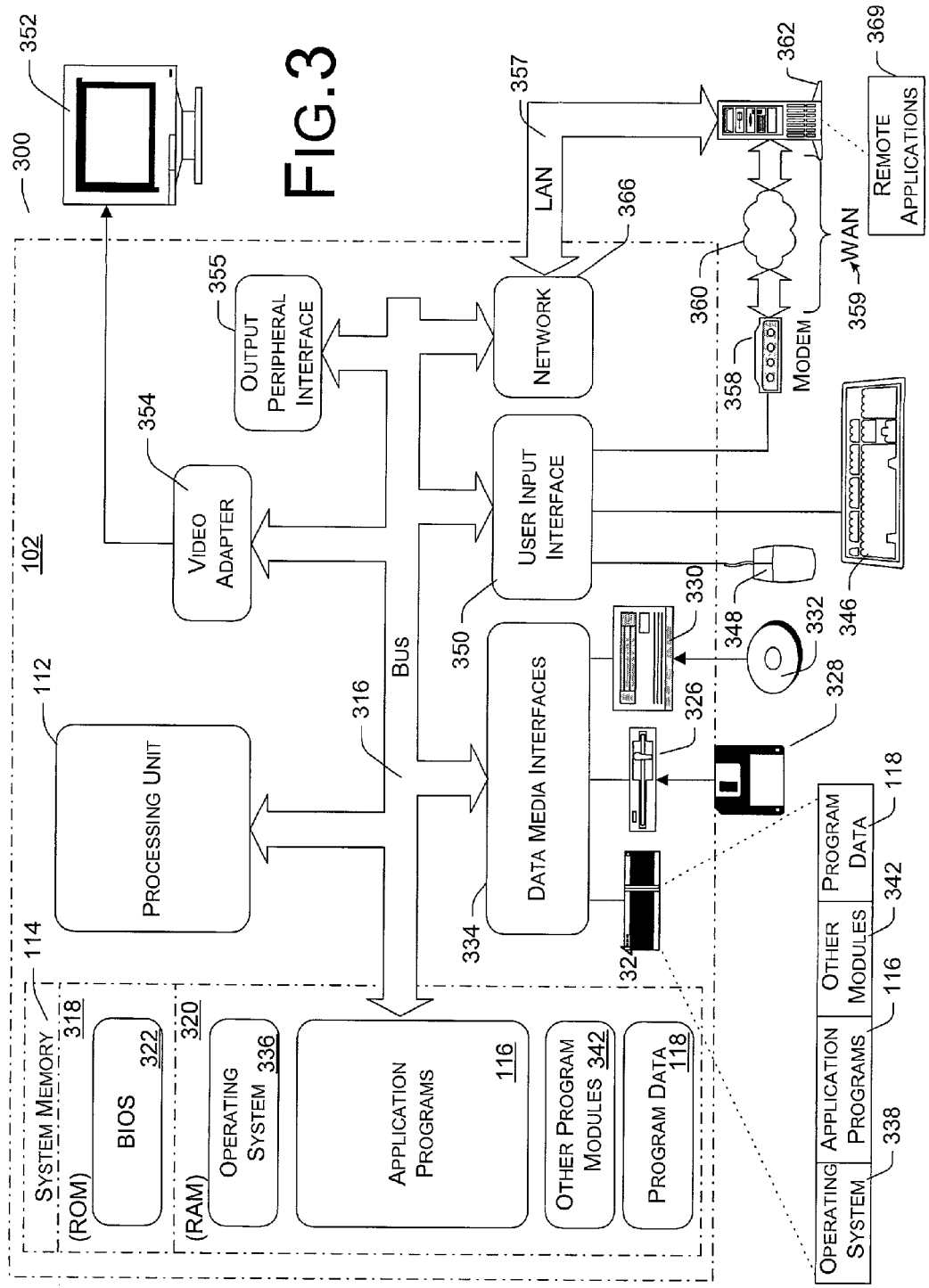

CLUSTERING WEB QUERIES

TECHNICAL FIELD

The following description relates to query similarity determinations, wherein the queries are used in information retrieval operations.

BACKGROUND

Today, Internet technologies link people together regardless of location. The rapid growth of the Internet use and explosion of the technological innovations it has engendered has fueled the growth of Web-based solutions designed to help individuals deal with the overwhelming amount of online information available on their desktops.

One such Web-based solution is a search engine to allow individuals to search and retrieve information across a network of changing resources. However, a simple search will typically return too many matching documents to be useful, and many if not all of the returned documents may be irrelevant to the user's need. Thus, few Web-based information search and retrieval applications enable users to discover specific answers to a question or even locate the documents most likely to contain the answer. This outcome is especially true when a user's query, or question includes commonly used words and/or refers to generic concepts or trends.

To address the need to find more precise answers to a user's query, a new generation of search engines, or "question answering systems" has been developed (e.g., the AskJeeves® question answering system that is located on the Web at http://www.askjeeves.com). Unlike the traditional search engines, which only use keywords to match documents, this new generation of search engines first attempts to "understand" user questions by suggesting other similar questions that other people have often asked and for which the system already has the correct answers. (The correct answers are typically pre-canned because they have been prepared in advance by human editors). Thus, if one system suggested question is truly similar to the user's question, the answer provided by the system will be relevant.

The common assumption behind such question answering systems is that many people are typically interested in the same questions, which are also called the "Frequently Asked Questions/Queries", or "FAQs". If the system can correctly identify these FAQs, then various forms of the user questions can be answered with more precision.

A number of human editors typically work to improve the contents of a search engine's hosting Website so that users can find relevant information from the website in a more precise manner. Their work mainly concerns the following two aspects: (1) if the search engine does not provide sufficient information for some often asked questions, the editors will add more documents in it to answer these questions; and, (2) if many users asked the same questions (FAQs) in a certain period of time (a hot topic), then the answers to these questions will be checked manually and directly linked to the questions. However, evaluating by human editors which user submitted questions/queries are FAQs and which are not is not a simple procedure. One reason for this is because user submitted queries are typically very different not only in form but also generally different in intention.

For example, consider one query clustering approach wherein queries are represented as respective sets of keywords. If it is determined that a first query and a different second query share one or more of these keywords in common, then they are considered to be somewhat similar queries. Analogously, it is traditionally thought that the more keywords that respective queries share in common, the greater the similarity between the queries, and the more these shared keywords are considered to be important in identifying other similar queries.

Unfortunately, there are a number of problems associated with traditional query clustering techniques. One problem, for example, is that a particular keyword that is shared across two respective queries may not represent the same information need across other various queries (e.g. the keyword "table" may refer to a computer software data structure, an image in a document, a furniture item, and so on). Additionally, different keywords may refer to the same concept as the particular keyword (e.g., the keyword "table", may also be referenced in other queries with the following keywords: "diagram", "bench", "schema", "desk", etc.). Therefore, the similarity between two semantically similar queries may be small, while the calculated similarity between two semantically unrelated queries may be high, especially when queries are short.

In view of the above, it is apparent that traditional query clustering techniques are often ineffective because of common non-correspondence between keywords and keyword meanings. Accordingly, the following described subject matter addresses these and other problems associated with evaluating the similarity between various queries so that similar queries can be clustered together to rapidly determine FAQs.

SUMMARY

The described subject matter provides systems and procedures to make query similarity determinations, wherein the queries are used in information retrieval operations. A same document and/or multiple similar documents are identified that have been selected by a user in response to multiple queries. Responsive to identifying the same document and/or the similar documents, a query cluster is generated that indicates that the queries used to obtain the same and/or similar documents. This is accomplished in a manner that is independent of whether individual ones of the queries are compositionally similar with respect to other ones of the queries.

BRIEF DESCRIPTION OF THE DRAWINGS

The same numbers are used throughout the drawings to reference like features and components.

FIG. 3 shows an example of a suitable computing environment on which an exemplary system and procedure to identify and cluster similar queries based on aspects of user feedback may be implemented.

DETAILED DESCRIPTION

The following description sets forth exemplary subject matter to identify and cluster similar queries based on aspects of user feedback. The subject matter is described with specificity in order to meet statutory requirements. However, the description itself is not intended to limit the scope of this patent. Rather, the inventors have contemplated that the claimed subject matter might also be embodied in other ways, to include different elements or combinations of elements similar to the ones described in this document, in conjunction with other present or future technologies.

Overview

The following description puts forth a new approach to identify and cluster similar queries based on aspects of user feedback. In networking environments users typically use search engines to provide an abundant number of queries and subsequent document selections (e.g., user clicks). If a user has selected same or similar documents in response to submitting various queries, it is determined that the submitted queries are similar and can be clustered together—independent of respective query composition.

Exemplary System to Cluster Web Queries

Figure 1:
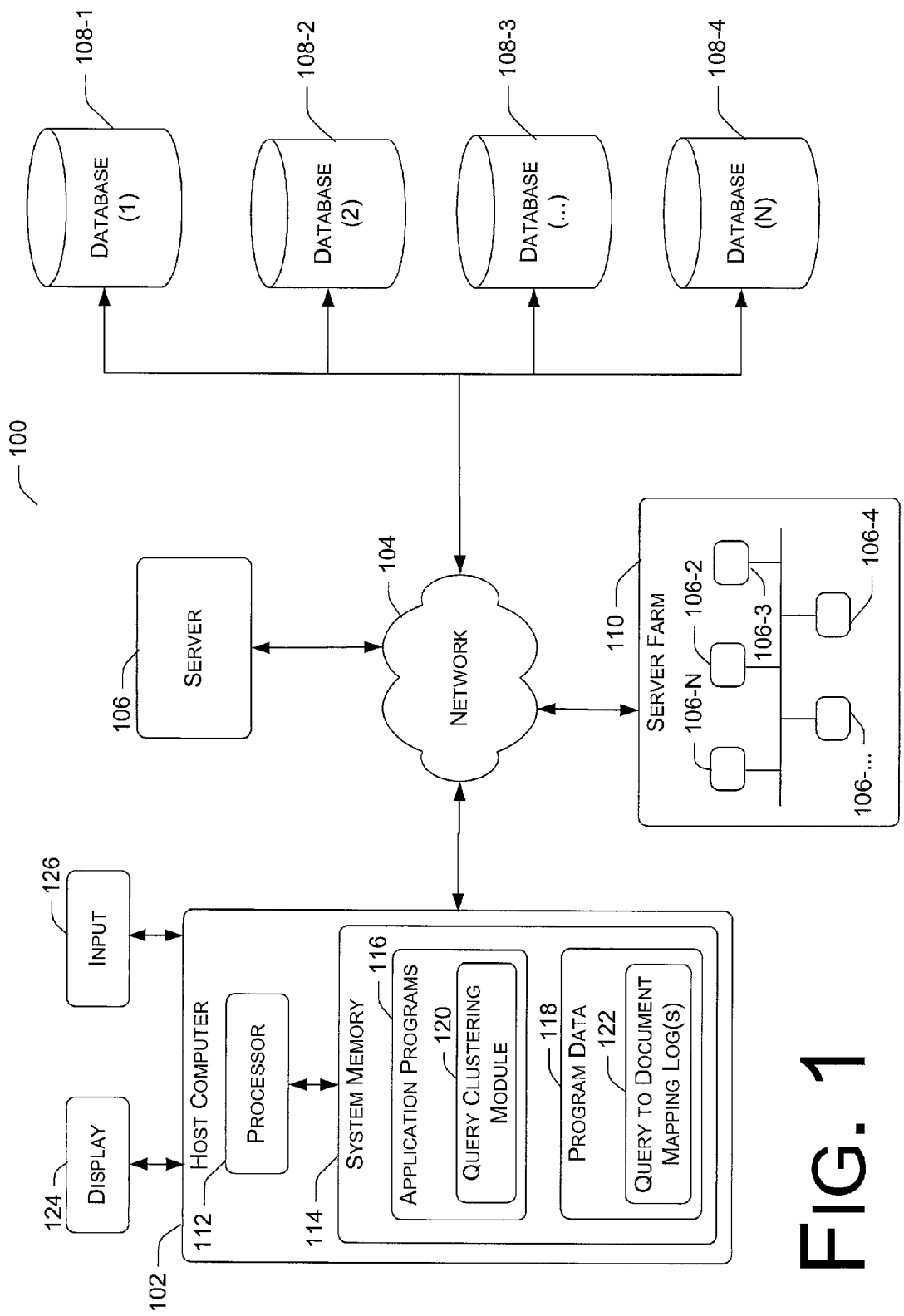
FIG. 1 shows an exemplary system to identify and cluster similar queries to rapidly determine a FAQ.

FIG. 1 shows an exemplary system 100 to identify and cluster similar queries to rapidly determine a FAQ. The system includes a host computer 102 that is operatively coupled across a communications medium 104 to one or more server 106 computers. The host computer and the server computers are also operatively coupled across the communications medium to one or more databases 108.

The host computer 102 is configured to communicate generated queries and receive responses to the communicated queries to/from other computer's, servers 106, server appliances, and so, on over the communication medium 104. There are numerous ways to generate a query. Queries can be automatically generated by a computer program, or queries can be input into a search engine user interface (UI) displayed in a Web Browser such as the Microsoft Internet Explorer® Web browser application. Thus, a "user" generating a query in this context can be a human being, a computer program, and so on.

The host computer includes a processor 112 that is coupled to a system memory 114. The processor 112 is configured to fetch and execute computer program instructions from application programs 116 such as a query clustering module 120, and other applications (e.g., an operating system, a Web browser application, etc. . . . ). The processor is also configured to fetch program data 118 from the system memory in response to executing the application programs. For example, to map a number of selected documents to a query, the processor fetches, reads, and/or writes information to/from the mapping log 122 database.

The system memory includes any combination of volatile and non-volatile computer-readable media for reading and writing. Volatile computer-readable media includes, for example, random access memory (RAM). Non-volatile computer-readable media includes, for example, read only memory (ROM), magnetic media such as a hard-disk, an optical disk drive, a floppy diskette, a flash memory card, a CD-ROM, and/or the like.

The host device 102 is operatively coupled to a display device 124 (e.g., a CRT, flat-panel monitor, etc.) to display UT components (i.e., a search engine UI to generate queries and select documents (for subsequent viewing, downloading, and so on) returned by the search engine responsive to the generated queries). A user enters queries, commands, and so on, into computer 102 through the input device 126 (e.g., a keyboard, a microphone, pointing devices such as a "mouse", etc).

The communication medium 104 is a parallel connection, a packet switched network (e.g., an organizational intranet network), the Internet, and/or other communication configurations that provide electronic exchange of information between the host device 102, the servers 106, and the databases 108 using an appropriate protocol (e.g., TCP/IP, UDP, SOAP, etc.). Other system arrangements are possible including additional host devices, more or less servers, databases, and so on. For example, the communication medium through one or more server appliances (not shown) can operatively couple the host computer to a server farm 110 (e.g., a Web server farm, a corporate portal, and so on).

A database 108 is an object-oriented database such as an Extensible Markup Language (XML) database, a Hypertext Markup Language (HTML) database, an SQL server database, and/or the like.

The subject matter is illustrated in FIG. 1 as being implemented in a suitable computing environment. Although not required, the subject matter is described in the general context of computer-executable instructions, such as the query clustering program module 120 that is executed by the host device 102 to cluster queries based on user feedback. Program modules typically include routines, programs, objects, components, data structures, and the like, that perform particular tasks or implement particular abstract data types.

An Exemplary User Log

FIG. 1 shows an exemplary query to document mapping user log 122, which hereinafter is also often referred to as a "user log". The information, or data in the user log includes information that is extracted from various query sessions as follows:

session:=<query text>[relevant document(s)]

Each session corresponds to one query and the relevant documents the user selects. The query text may be a well-formed natural language question, or one or a few keywords, or phrases. Responsive to user input of the query text into a search engine such as Microsoft Network Search (MSN Search®), a list of located documents is typically presented to the user in a Web browser window. The relevant documents are those documents that the user selected clicked from this list. If a user clicks on a document, it is likely that the document is relevant, or at least related to some extent, to the query. It is expected that the number and size of the generated and stored query logs will be substantial since Web browsing and querying is a very popular activity. Even if some of the user document selections are erroneous (e.g., are not relevant to the query for some reason), user's typically select documents that are related to the query.

Preliminary results using this technique have been very encouraging because it actually identifies and clusters many queries that are similar. Additionally, tests have shown that this technique identifies many similar questions, which otherwise would have been put into different clusters by traditional clustering approaches because they do not share any common keyword. This study demonstrates the usefulness of user logs for query clustering, and the feasibility of an automatic tool to detect FAQ's for a search engine.

Exemplary Query Clustering Criteria

The query clustering approach is based on the following two criteria: (1) if two queries contain the same or similar terms, they are determined to respectively represent the same or similar information needs; and (2) if user submission of multiple queries result in at least a portion of the same or similar document selections across both queries, then the queries are considered to be similar (i.e., the queries are clustered together independent of respective query compositional aspects).

These two query clustering criteria complement one another. The first criterion provides for grouping queries of similar composition. The more words in a query, the more reliable is the first criterion. However, users often submit short queries to a search engine, and a typical query on the Web typically includes only one or two words. In many cases, there is not enough information to deduce users' information needs correctly using the first criterion. In contrast to the first criteria, which relies similarity of composition between queries, the second criterion relies on the user's judgment to determine which documents are relevant to the query. Thus, substantially optimal query clustering results are produced by using a combination of both criteria.

Exemplary Similarity Functions Based on Query Contents

There are different techniques to determine similarity of contents across querys: similar keywords, words in their order, and similar phrases. Each technique provides a different measure of similarity, and each shows some useful information.

Similarity Based on Keywords or Phrases

This measure directly comes from information retrieval (IR) studies. Keywords are the words except function words included in a stop-list. All the keywords are stemmed using the Porter's algorithm (Porter 1980). The keyword-based similarity function is defined as follows:

$$similarity_{keyword}(p, q) = \frac{KN(p, q)}{\text{Max}(kn(p), kn(q))}, \quad [1]$$

where kn(.) is the number of keywords in a query, KN(p, q) is the number of common keywords in two queries.

If query terms are weighted, the Cosine similarity (Salton and McGill 1983) can be used instead:

$$similarity_{w-keyword}(p, q) = \frac{\sum_{i=1}^{k} cw_i(p) \times cw_i(q)}{\sqrt{\sum_{i=1}^{m} w_i^2(p)} \times \sqrt{\sum_{i=1}^{n} w_i^2(q)}}, \quad [2]$$

where $cw_i(p)$ and $cw_i(q)$ are the weights of the i-th common keyword in the query p and q respectively, and $wi(p)$ and $wi(p)$ are the weights of the i-th keywords in the query p and q respectively. In one configuration, tf*idf (Salton and McGill 1983) is used to weight keywords. The tf (term frequency) factor is the frequency of a term in a query. The idf (inverse document frequency) factor is the inverse of the frequency of a term among the documents in the collection. The previous experiments have proven that the most effective term-weighting schemes for information retrieval is to combine these two factors.

The above measures can be easily extended to phrases. Phrases are more precise representation of meaning than single words. Therefore, by identifying phrases in queries, more accurate calculation of query similarity is obtained. For example, two queries "history of China" and "history of the United States" are very close queries (asking about the history of a country). Their similarity is 0.33 on the basis of keywords. If "the United States" is recognized as a phrase and identified as a single term, the similarity between these two queries is increased to 0.5. The calculation of phrase-based similarity is similar to formulas [1] and [2]. There are numerous methods to recognize phrases in a query. One is by using a noun phrase recognizer based on some syntactic rules (Lewis and Croft, 1990). Another technique is simply to use a phrase dictionary to recognize phrases in queries.

Query Similarity Based On String Matching

The string matching measure uses all the words in the queries for similarity estimation, even the stop words. Comparison between queries becomes an inexact string-matching problem as formulated by Gusfield (Gusfield 1997). Similarity may be determined by edit distance, which is a measure based on the number of edit operations (insertion, deletion, or substitution of a word) necessary to unify two strings (queries). The edit distance is further normalized by using the maximum number of the words in the two queries to divide the edit distance so that the value can be constrained within the range of [0, 1]. The similarity is inversely proportional to the normalized edit distance:

$$similarity_{edit}(p, q) = 1 - \frac{\text{Edit\_distance}(p, q)}{\text{Max}(wn(p), wn(q))} \quad [3]$$

The advantage of this measure is that it takes into account the word order, as well as words that denote query types such as "who" and "what" if they appear in a query. This method is more flexible than those used in QA systems, which rely on special recognition mechanisms for different types of questions.

In preliminary results, this measure is very useful for long and complete questions in natural language. Below are some queries put into one cluster:

Query 1: Where does silk come?
Query 2: Where does lead come from?
Query 3: Where does dew comes from?

This cluster contains questions of the form "Where does X come from?"

In the similarity calculations described above, a dictionary of synonyms can be incorporated. A set of synonyms is called a synset. If two words/terms are in the same synset, their similarity is set at a predetermined value (0.8 in our current implementation). It is easy to incorporate this similarity between synonyms into the calculation of query similarity.

Exemplary Similarity Functions Based on User Feedback

The documents D_C(.) (which is a subset of all the result list D(.)) which users clicked on for queries p and q may be seen as follows:

$$D\_C(p)=\{d_{p1}, d_{p2}, \ldots, d_{pi}\} \subseteq D(p)$$

$$D\_C(q)=\{d_{q1}, d_{q2}, \ldots, d_{qj}\} \subseteq D(q)$$

Similarity based on user clicks follows the following principle: If $D\_C(p) \cap D\_C(q) = \{d_{pq1}, d_{pq2}, \ldots, d_{pqk}\} \neq \emptyset$, then documents $d_{pq1}, d_{pq2}, \ldots, d_{pqk}$ represent the common topics of queries p and q. Therefore, a similarity between queries p and q is determined by $D\_C(p) \cap D\_C(q)$.

There are two ways to consider documents: in isolation or within a document hierarchy.

Similarity Determinations Based on Single Documents

A first feedback-based similarity considers each document in isolation. Therefore, the similarity is proportional to the number of common clicked individual documents as follows:

$$similarity_{single\_doc}(p, q) = \frac{RD(p, q)}{\text{Max}(rd(p), rd(q))} \quad [4]$$

where rd(.) is the number of clicked documents for a query, RD(p, q) is the number of document clicks in common.

Regardless of its simplicity, this measure demonstrates a surprising capability of clustering semantically related queries despite the different words used in them. Below are some queries from an obtained cluster:

Query 1: atomic bomb
Query 2: Nagasaki
Query 3: Nuclear bombs
Query 4: Manhattan Project
Query 5: Hiroshima
Query 6: nuclear fission
Query 7: Japan surrender
. . . .

Each of these queries corresponds to a document named "Atomic Bomb".

Additionally, this measure is also very useful to distinguish those queries having similar words but different information need. For example, if one user querys "law" and clicked the articles about legal problems, and another user asked "law" and clicked the articles about the order of nature, the two cases can be easily distinguished through user clicks. This distinction is useful for sense disambiguation in a user interface.

Similarity through Document Hierarchy

Documents in many search engines are not isolated. Rather, documents are typically organized into a hierarchy which corresponds to a concept space. For example, in Encarta Online®, this hierarchy contains four (4) levels. The first level is the root. The second level contains nine (9) categories, such as "physical science & technology", "life science", "geography", etc. These categories are divided into ninety-three (93) subcategories. The last level (the leaf nodes) is made up of tens of thousands of documents. The previous calculation is extended using this concept document hierarchy which considers the conceptual distance between documents within a hierarchy.

This conceptual distance is determined as follows: the lower the common parent node two documents have, the shorter the conceptual distance between the two documents. Let $F(d_i, d_j)$ denote the lowest common parent node for document $d_i$ and $d_j$, $L(x)$ the level of node x, L_Total the total levels in the hierarchy (i.e. 4 for Encarta). The conceptual similarity between two documents is defined as follows:

$$s(d_i, d_j) = \frac{L(F(d_i, d_j)) - 1}{L\_Total - 1} \quad [5]$$

In particular, $s(d_i, d_i)=1$; and $s(d_i, d_j)=0$ if $F(d_i, d_j)=\text{root}$.

Now, the document similarity is incorporated into the calculation of query similarity. Let $d_i(1 \leq i \leq m)$ and $d_j(1 \leq j \leq n)$ be the clicked documents for queries p and q respectively. The hierarchy-based similarity is defined as follows:

$$similarity_{hierarchy}(p, q) = \quad [6]$$

$$\frac{1}{2} \times \left( \frac{\sum_{i=1}^{m} \left( \max_{j=1}^{n} s(d_i, d_j) \right)}{rd(p)} + \frac{\sum_{j=1}^{m} \left( \max_{i=1}^{n} s(d_i, d_j) \right)}{rd(q)} \right)$$

The following two queries are recognized as similar using formula [6]:

Query 1: <query text> image processing
<relevant documents> ID: 761558022 Title: Computer Graphics
Query 2: <query text> image rendering
<relevant documents> ID: 761568805 Title: Computer Animation Both documents have a common parent node "Computer Science & Electronics". According to formula [5], the similarity between the two documents is 0.66, so it that between two queries. In contrast, their similarity based on formula [4] is 0. This novel similarity function typically recognizes a substantially greater range of similar queries as compared to traditional approaches to determine query similarity.

The Combination of Multiple Measures of Query Similarity

Similarities based on query contents and user document selections in response to respectively submitted queries represent two different points of view. In general, term-based measures tend to cluster queries with the same or similar terms. Feedback-based measures tend to cluster queries related to the same or similar topics. Since information needs may be partially captured by both query texts and relevant documents, some combined measures taking advantage of both measures can be defined. A simple way to do it is to combine different measures linearly as follows:

$$similarity = \alpha * similarity_{content} + \beta * similarity_{feedback} \quad [7]$$

Rather than determining parameters $\alpha$ and $\beta$ in advance, these parameters are set according to editor objectives and are adjusted through utilization. Now described is a simple example that illustrates possible effects of different measures as well as their combination.

Consider the four (4) queries shown below in Table 1. Assume that the similarity threshold is set at 0.6. The expected result would be Queries 1 and 2 in a first cluster, and Queries 3 and 4 in a different cluster.

TABLE 1

EXAMPLE QUERYS

| Query 1: | <query text> law of thermodynamics | |
| | <relevant documents> | ID: 761571911 Title: Thermodynamics |
| | | ID: 761571262 Title: Conservation Laws |

TABLE 1-continued

EXAMPLE QUERYS

| Query 2: | <query text> conservation laws | |
| --- | --- | --- |
| | <relevant documents> | ID: 761571262 Title: Conservation Laws |
| | | ID: 761571911 Title: Thermodynamics |
| Query 3: | <query text> Newton law | |
| | <relevant documents> | ID: 761573959 Title: Newton, Sir Isaac |
| | | ID: 761573872 Title: Ballistics |
| Query 4: | <query text> Newton law | |
| | <relevant documents> | ID: 761556906 Title: Mechanics |
| | | ID: 761556362 Title: Gravitation |

If the keyword-based measure (i.e., formula [1]) is applied to these queries, the queries are divided into the following three (3) clusters:

Cluster 1: Query 1;
Cluster 2: Query 2; and,
Cluster 3: Query 3 and Query 4.

Queries 1 and 2 cannot be clustered together.

If the measure based on individual documents (i.e., formula [4]), the following clusters are identified:

Cluster 1: Query 1 and Query 2;
Cluster 2: Query 3; and,
Cluster 3: Query 4.

Now Queries 3 and 4 are not determined to be similar.

If the measure based on document hierarchy (i.e., formula [5]) is applied to the queries in Table 1, the following document similarities shown in Table 2 are identified.

TABLE 2

Similarities between documents.

| | ① | ② | ③ | ④ | ⑤ | ⑥ |
| --- | --- | --- | --- | --- | --- | --- |
| ① Thermodynamics | 1.0 | 0.66 | 0.33 | 0.33 | 0.66 | 0.66 |
| ② Conservation laws | 0.66 | 1.0 | 0.33 | 0.33 | 0.66 | 0.66 |
| ③ Newton, Sir Isaac | 0.33 | 0.33 | 1.0 | 0.33 | 0.33 | 0.33 |
| ④ Ballistics | 0.33 | 0.33 | 0.33 | 1.0 | 0.33 | 0.33 |
| ⑤ Mechanics | 0.66 | 0.66 | 0.33 | 0.33 | 1.0 | 0.66 |
| ⑥ Gravitation | 0.66 | 0.66 | 0.33 | 0.33 | 0.66 | 1.0 |

Applying formula [6], the queries are grouped as follows:

Cluster 1: Query 1, Query 2, and Query 4; and,
Cluster 2: Query 3.

Thus, using this measure alone, it is not possible to separate Query 4 from Queries 1 and 2.

Now, applying formula [7] with both parameters $\alpha$ and $\beta$ set to 0.5. The queries are clustered in the expected way:

Cluster 1: Query 1 and Query 2; and,
Cluster 2: Query 3 and Query 4.

The purpose of this example is to show that with some proper combination of different measures, better results are obtained. Therefore, in trying different combinations, the editors have better chances to locate desired FAQs. (A user interface (UI) such as a Microsoft WINDOWS based UI allows a user to select from the various functions and to set different combination parameters).

The query cluster module 120 of FIG. 1 provides at least a portion of the above described query clustering analysis, such as the query clustering analysis that is based on user feedback.

An Exemplary Query Clustering Algorithm

The exemplary query clustering module 120 of FIG. 1 can use any similarity functions described above to cluster similar queries.

There are many clustering algorithms available. The main characteristics that guide the choosing of clustering algorithms are the following ones:

1) As query logs usually are very large, the algorithm should be capable of handling a large data set within reasonable time and space constraints.

2) The algorithm should not require manual setting of the resulting form of the clusters, e.g. the number or the maximal size of clusters. It is unreasonable to determine these parameters in advance.

3) Since the purpose of this approach is to find frequently asked queries (FAQs), the algorithm should filter out those queries with low frequencies.

4) Due to the fact that the log data changes daily, the algorithm should be incremental.

All clustering algorithms meeting the above requirements, such as the DBSCAN algorithm (Ester et al. 1996), can be the good candidate query clustering algorithms. DBSCAN does not require the number of clusters as an input parameter. A cluster consists of at least the minimum number of points—MinPts (to eliminate very small clusters as noise); and for every point in the cluster, there exists another point in the same cluster whose distance is less than the distance threshold Eps (points are densely located). The algorithm makes use of a spatial indexing structure (R*-tree) to locate points within the Eps distance from the core points of the clusters. All clusters consisting of less than the minimum number of points are considered as "noise" and are discarded. The average time complexity of the DBSCAN algorithm is O(n*logn). In our experiments, it only requires 3 minutes to deal with one-day user logs of 150,000 queries. Incremental DBSCAN (Ester et al. 1998) is an incremental version, which can update clusters incrementally. This is due to the particularity of density-based nature of DBSCAN, i.e. the insertion or deletion of an object only affects the neighborhood of this object. In addition, based on the formal definition of clusters, it has been proven that the incremental algorithm yields the same results as DBSCAN. The performance evaluation of Incremental DBSCAN demonstrates its better efficiency compared with the basic DBSCAN algorithm.

An Exemplary Procedure to Cluster Similar Queries

Figure 2:
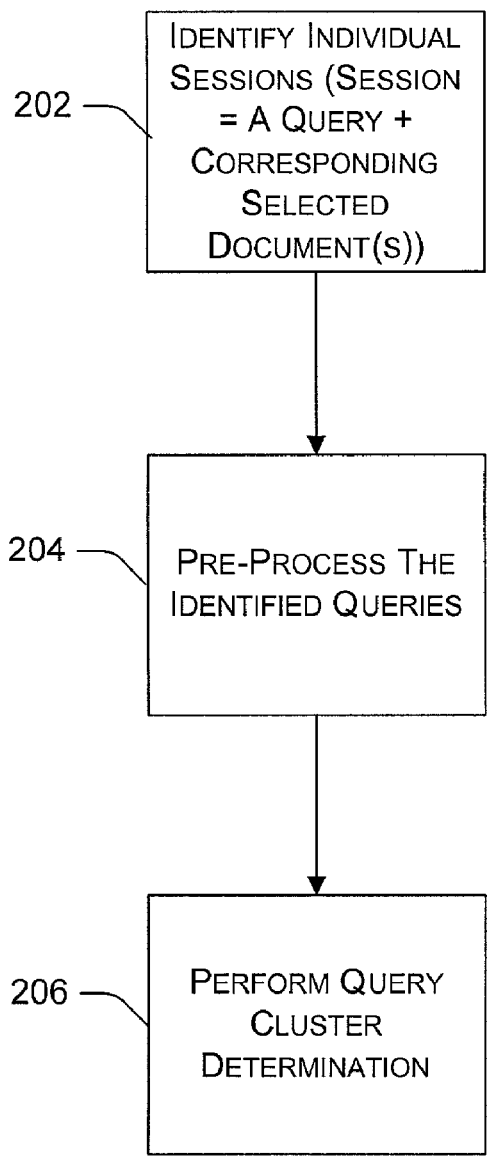
FIG. 2 shows an exemplary procedure to use document selection feedback to identify and cluster similar queries.

FIG. 2 shows an exemplary procedure 200 to use document selection feedback to identify and cluster similar queries. At block 202, query clustering process (i.e., the query clustering module 120 of FIG. 1) identifies individual querying and document selection sessions. Each session includes a respective query by a user and a number of documents selected by the user in response to the query. Documents can be represented in a number of ways such as with a Universal Resource Locator (URL) that identifies a specific file or other resource, a particular Web-site, and so on.

At block 204, the query clustering process pre-processes the identified queries (block 202) to determine word stems, stop words, recognize phrases, label synonyms, and so on. At block 206, the query clustering process clusters similar queries together. As described in greater detail above in reference to FIG. 1, similarities based on at least user selection feedback is used to identify queries that correspond to similar topics in a number of different ways (e.g., similarity determinations based on single documents and document hierarchical positioning, etc. . . . ). Additionally, query similarity based on query composition can be used to cluster queries with same or similar composition.

Alternative Applications

The above described subject matter provides core techniques to explore a users' search intentions on the Web. The most direct application of this technique is to help human editors find FAQ's. However, the above described subject matter can be used for other purposes such as:
- using these techniques as word disambiguation tools by considering each selected document as a possible meaning of a query word.
- using these techniques to construct a live thesaurus by considering every cluster as a synset.
- using these techniques to identify those topics that users are substantially interested in and those topics that users are less interested in to provide valuable knowledge for the website administrators to improve their systems.

Exemplary Computing Environment

FIG. 3 shows an example of a suitable computing environment 300 on which an exemplary system and procedure to identify and cluster similar queries based on aspects of user feedback may be implemented. Exemplary computing environment 300 is only one example of a suitable computing environment and is not intended to suggest any limitation as to the scope of use or functionality of an exemplary system and procedure to cluster queries. The computing environment 300 should not be interpreted as having any dependency or requirement relating to any one or combination of components illustrated in the exemplary computing environment 300.

The exemplary system and procedure to identify a cluster of similar queries based on user feedback is operational with numerous other general purpose or special purpose computing system environments or configurations. Examples of well known computing systems, environments, and/or configurations that may be suitable for use with an system and procedure to cluster queries include, but are not limited to, personal computers, server computers, thin clients, thick clients, hand-held or laptop devices, multiprocessor systems, microprocessor-based systems, set top boxes, programmable consumer electronics, wireless phones, application specific integrated circuits (ASICS), network PCs, minicomputers, mainframe computers, distributed computing environments that include any of the above systems or devices, and the like.

An exemplary system and procedure to cluster queries may be described in the general context of computer-executable instructions, such as program modules, being executed by a computer. Generally, program modules include routines, programs, objects, components, data structures, etc. that perform particular tasks or implement particular abstract data types. An exemplary system and procedure to cluster queries may also be practiced in distributed computing environments where tasks are performed by remote processing devices that are linked through a communications network. In a distributed computing environment, program modules may be located in both local and remote computer storage media including memory storage devices.

As shown in FIG. 3, the computing environment 300 includes a general-purpose computing device in the form of a computer 102. (See, the computer 102 of FIG. 1. The same numbers are used throughout the drawings to reference like features and components.) The components of computer 102 may include, by are not limited to, one or more processors or processing units 112, a system memory 114, and a bus 316 that couples various system components including the system memory 114 to the processor 112.

Bus 316 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

Computer 102 typically includes a variety of computer-readable media. Such media may be any available media that is accessible by the computer 102, and it includes both volatile and non-volatile media, removable and non-removable media. For example, the system memory 114 includes computer readable media in the form of volatile memory, such as random access memory (RAM) 320, and/or non-volatile memory, such as read only memory (ROM) 318. A basic input/output system (BIOS) 322, containing the basic routines that help to transfer information between elements within computer 102, such as during start-up, is stored in ROM 318. RAM 320 typically contains data and/or program modules that are immediately accessible to and/or presently be operated on by processor 112.

Computer 102 may further include other removable/non-removable, volatile/non-volatile computer storage media. By way of example only, FIG. 3 illustrates a hard disk drive 324 for reading from and writing to a non-removable, non-volatile magnetic media (not shown and typically called a "hard drive"), a magnetic disk drive 326 for reading from and writing to a removable, non-volatile magnetic disk 328 (e.g., a "floppy disk"), and an optical disk drive 330 for reading from or writing to a removable, non-volatile optical disk 332 such as a CD-ROM, DVD-ROM or other optical media. The hard disk drive 324, magnetic disk drive 326, and optical disk drive 330 are each connected to bus 316 by one or more interfaces 334.

The drives and their associated computer-readable media provide nonvolatile storage of computer readable instructions, data structures, program modules, and other data for computer 102. Although the exemplary environment described herein employs a hard disk, a removable magnetic disk 328 and a removable optical disk 332, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk, magnetic disk 328, optical disk 332, ROM 318, or RAM 320, including, by way of example, and not limitation, an OS 338, one or more application programs 116, other program modules 342, and program data 118. Each such OS 338, one or more application programs 116, other program modules 342, and program data 118 (or some combination thereof) may include an embodiment of an exemplary system and procedure to cluster queries.

A user may enter commands and information into computer 102 through input devices such as keyboard 346 and pointing device 348 (such as a "mouse"). Other input devices (not shown) may include a microphone, joystick, game pad, satellite dish, serial port, scanner, or the like. These and other input devices are connected to the processing unit 112 through a user input interface 350 that is coupled to bus 316, but may be connected by other interface and bus structures, such as a parallel port, game port, or a universal serial bus (USB).

A monitor 352 or other type of display device is also connected to bus 316 via an interface, such as a video adapter 354. In addition to the monitor, personal computers typically include other peripheral output devices (not shown), such as speakers and printers, which may be connected through output peripheral interface 355.

Computer 102 may operate in a networked environment using logical connections to one or more remote computers, such as a remote computer 362. Logical connections shown in FIG. 3 are a local area network (LAN) 357 and a general wide area network (WAN) 359. Such networking environments are commonplace in offices, enterprise-wide computer networks, intranets, and the Internet. Remote computer 362 may include many or all of the elements and features described herein relative to computer 102.

When used in a LAN networking environment, the computer 102 is connected to LAN 357 via network interface or adapter 366. When used in a WAN networking environment, the computer typically includes a modem 358 or other means for establishing communications over the WAN 359. The modem 358, which may be internal or external, may be connected to the system bus 316 via the user input interface 350 or other appropriate mechanism.

Depicted in FIG. 3 is a specific implementation of a WAN via the Internet. Computer 102 typically includes a modem 358 or other means for establishing communications over the Internet 360. Modem 358, which may be internal or external, is connected to bus 316 via interface 350.

In a networked environment, program modules, depicted relative to the personal computer 102, or portions thereof, may be stored in a remote memory storage device. By way of example, and not limitation, FIG. 3 illustrates remote application programs 369 as residing on a memory device of remote computer 362. The network connections shown and described are exemplary and other means of establishing a communications link between the computers may be used.

Computer-Executable Instructions

An implementation of an exemplary system and procedure to cluster queries may be described in the general context of computer-executable instructions, such as program modules, executed by one or more computers or other devices. Program modules typically include routines, programs, objects, components, data structures, and the like, that perform particular tasks or implement particular abstract data types. The functionality of the program modules typically may be combined or distributed as desired in the various embodiments of FIG. 3.

Computer Readable Media

An implementation of exemplary subject matter to system and procedure to cluster queries may be stored on or transmitted across some form of computer-readable media. Computer-readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Evaluation Results

This section provides empirical evidence on how different similarity functions affect the query clustering results. We collected one-month user logs (about 22 GB) from the Encarta®) Web site. From these logs we extracted 2,772,615 user query sessions. Table 3 illustrates the distribution of query lengths in terms of number of words. We notice that 49% of queries contain only one keyword and 33% of queries contain two keywords. The average length of all is queries is 1.86. The distribution of query length is similar to those reported by others. Because the number of queries is too big to conduct detailed evaluations, we randomly chose 20,000 query sessions from them for our evaluations.

TABLE 3

Example Distribution of Query Lengths in Terms of Number of Words

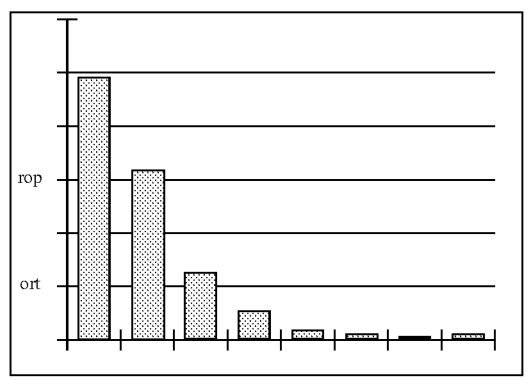

We tested the following four similarity functions on the 20,000 query sessions:

keyword similarity (K-Sim), cross-reference similarity using single documents (S-Sim), keyword+cross-reference similarity using single documents (K+S-Sim), and keyword+cross-reference similarity using document hierarchy (K+H-Sim).

The minimal density parameter (MinPts) was set to 3 uniformly, which means that only those clusters containing at least 3 queries are kept. Then we varied the similarity threshold (=1−Eps) from 0.5 to 1.0. We assigned weight 0.5 to both α and β.

Verification of the FAQ Concept

By varying the similarity threshold we obtain different proportions and numbers of clustered queries (Tables 4 and 5). When using K-Sim to cluster all 20,000 queries, the proportions of clustered queries decrease from 0.80 to 0.48 (Table 4) and the number of clusters decreases from 1778 to 1368 (Table 5), along with the change of similarity threshold from 0.5 to 1.0. It is interesting to observe the threshold at 1.0 (where queries in the same cluster are formed with identical keywords). We see that 48% queries are formed with the same keywords and they appeared at least three times. The average number of queries per cluster in this case is 7.1.

TABLE 4

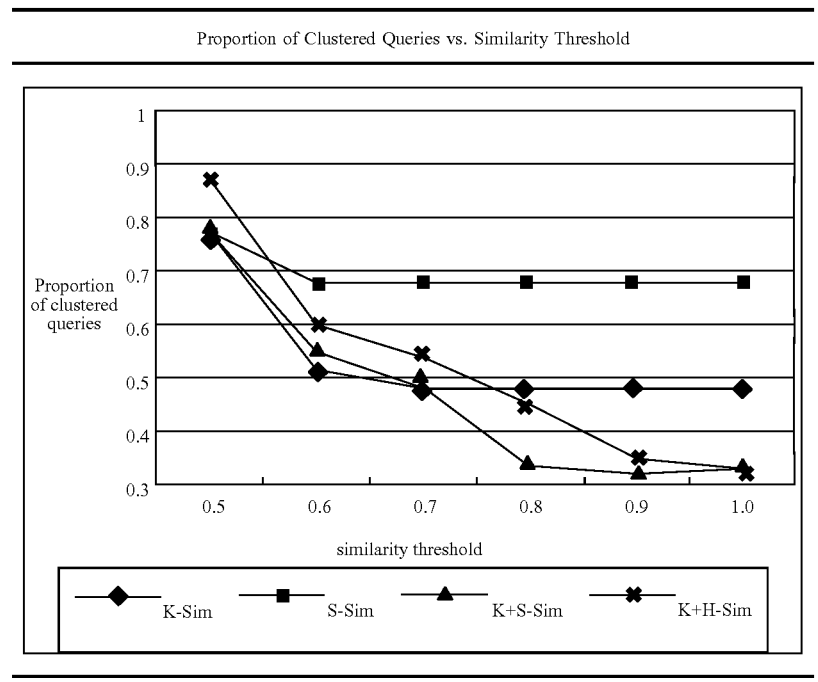

TABLE 5

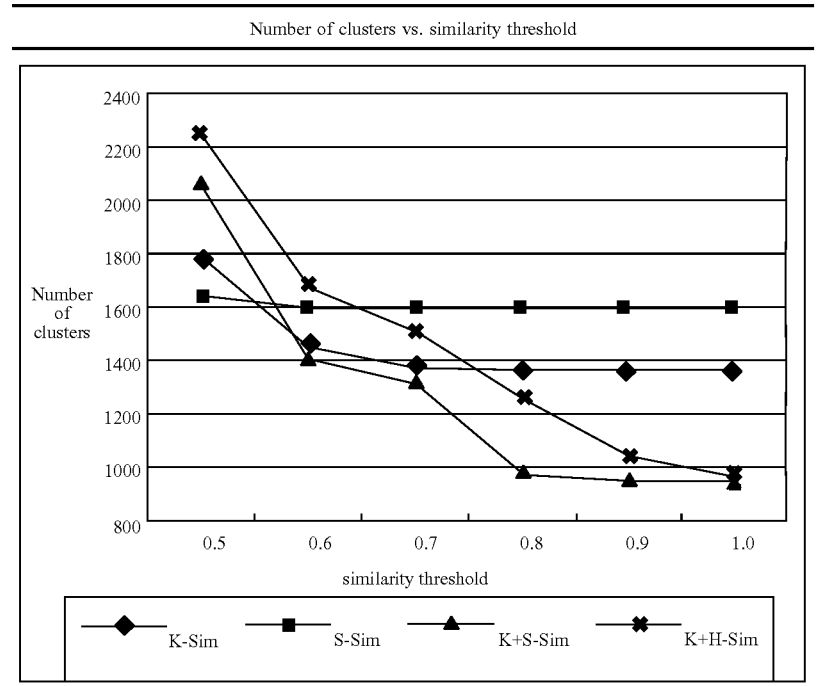

The proportions of clustered queries of S–Sim decrease from 0.79 to 0.66 and the number of clusters decrease from 1632 to 1602 when similarity threshold is varied from 0.5 to 1.0. When similarity threshold is 1.0, 66% queries are put into 1756 clusters and the average number of queries per cluster is 8.24.

Tables 4 and 5 show that many users' interests focus on a relatively small number of topics—they often use a small set of words, and they choose to read a small set of documents. This confirms the hypothesis behind the FAQ approach—that many users are interested in the same topics (or FAQs).

The comparison between the K-Sim and S-Sim curves shows that clusters using S-Sim covers more queries than K-Sim. This suggests that there are more divergences in query words than in document selections.

Both combinations shown in tables 4–5 change more than single-criterion functions. The small proportion of clustered queries at threshold=1.0 shows that it is difficult to satisfy completely condition of both identical words and identical document selections. However, when threshold is low (0.5), there may be more queries clustered in a combined approach (K+H-Sim) than in the single-criterion approaches; but the size of clusters is smaller (because there are much more clusters).

To further verify this hypothesis, we draw the following figures which show the correlation between number of clustered queries and number of clusters (see, Table 6). The clusters in this figure are obtained with threshold set at 1.0, i.e. they contain identical queries—queries with identical keywords (K-Sim) or queries leading to the same document clicks (S-Sim).

TABLE 6

Correlation Between Number of Clustered Queries and Number of Clusters

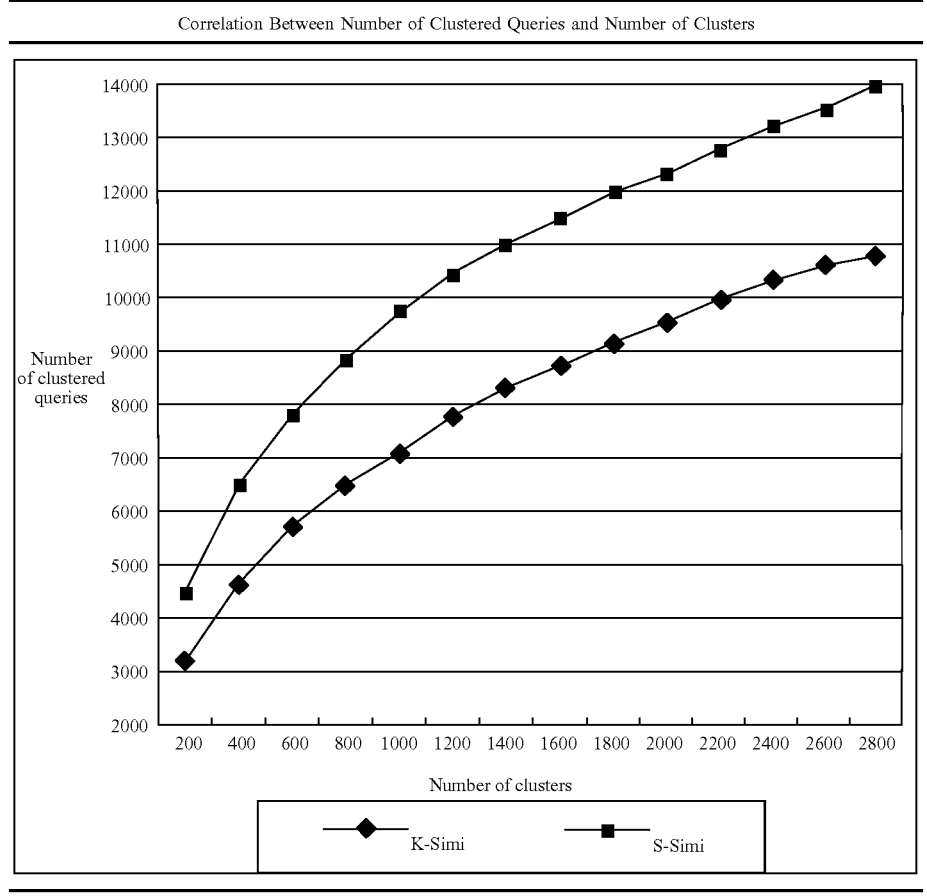

In Table 6, we can see that quite a number of identical queries appear in a small number of clusters (the biggest clusters). For example, the K-Simi curve shows that the 4500 most popular queries (22.5% of the total number) are grouped into only about 400 clusters, which further confirm the FAQ concept, i.e. many users tend to use similar or identical queries in a period of time. Moreover, S-Simi curve shows that only 200 clusters are needed to cover the 4500 top queries, which confirms that many users are interested in a small number of documents, i.e. there is a similar concept of Frequently Asked Documents (FAD). In addition, through the comparison of the two curves, we can see that there is a stronger concentration in documents clicks than in common keywords.

Quality of Clustering Results

We borrow two metrics in IR to measure the quality of clustering results:

(a) Precision—the ratio of the number of similar queries to the total number of queries in a cluster.

(b) Recall—the ratio of the number of similar queries to the total number of all similar queries for these queries (both in this cluster and not in).

For every similarity function, we randomly selected 100 clusters from the resulting clusters. Then we manually checked the queries in every cluster if it is truly similar to others, and calculate the precision for the cluster. Since we do not know the actual intentions of users with their queries, we can just guess them at our best efforts according to both queries and the clicked documents. We report the average precision of the 100 clusters in Table 7, where all the four functions are shown with similarity threshold varying from 0.5 to 1.0.

TABLE 7

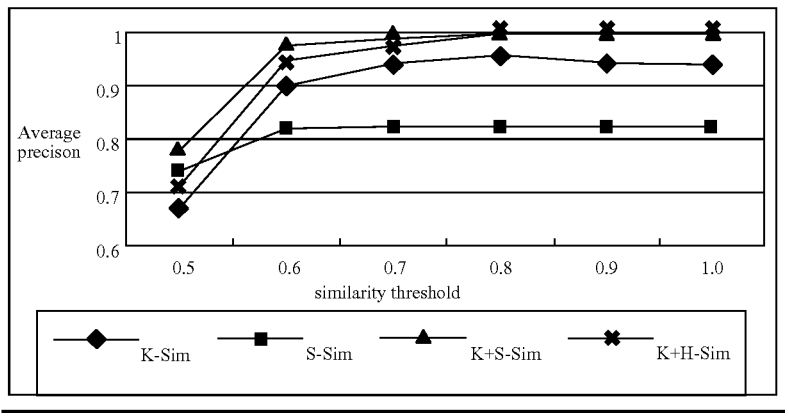

Precision for Four (4) Kinds of Similarity Functions

We first observe that the combinations of keywords and cross-references (K+S-Sim and K+H-Sim) result in higher precision than the two criteria separately. When similarity threshold is equal to or higher than 0.6, K+S-Sim and K+H-Sim have very high precision (above 95%). When similarity threshold is higher than 0.8, the precision for both similarity functions reaches 1.0.

For clustering using single criteria, we observe that the highest precision can be reached by K-Sim is about 96%, when all queries in a cluster contain identical keywords. This means the ambiguity of keywords will only bring in about 4% errors. This number is much lower than our expectation. A possible reason is that users usually are aware of word ambiguity and would like to use more precise queries. For example, instead of using "Java", users use "Java island" or "Java programming language" to avoid ambiguities.

It is difficult to use the recall metric directly for clustering because no standard clusters or classes are available. Therefore, we use a different measure to reflect, to some extent, the recall factor—normalized recall. This factor is calculated as follows:

For any similarity function, we collect the number of correctly clustered queries in all the 100 clusters. This indeed equals to total number of clustered queries times the precision.

Then we normalize this value by dividing it with the maximum number of correctly clustered queries. In our case, this number is 12357 which is obtained by K+H-Sim when similarity threshold is 0.5. This normalization aims to obtain a number in [0, 1] range.

Table 8 shows the normalized recalls for the four similarity functions when similarity threshold varies from 0.5 to 1.0.

TABLE 8

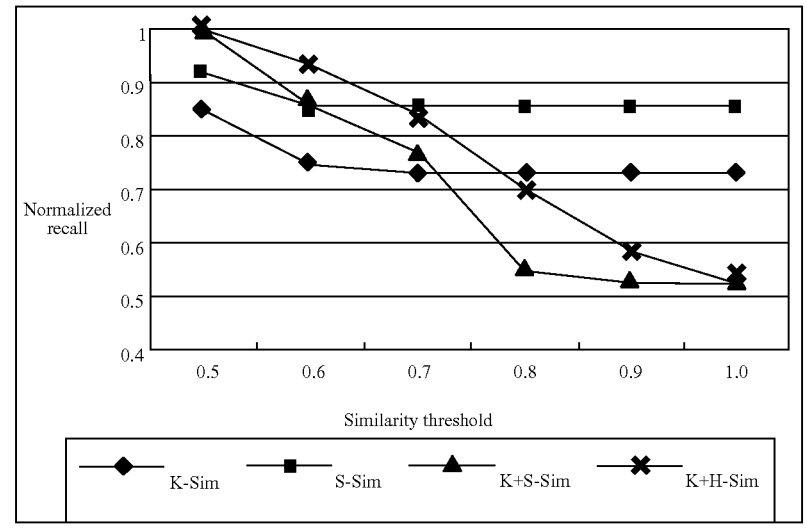

Recall for Four (4) Kinds of Similarity Functions

We observe that, when similarity threshold is below 0.6, K+H-Sim and S+H-Sim result in better normalized recall ratios than using two other functions on single criteria. This shows that both functions can take advantage of both criteria by combining them. However, when similarity threshold increases, then normalized recall ratios drop quickly. On the other hand, there is almost no change for S-Sim and K-Sim for threshold higher than 0.6. Again, this is due to the small number of keywords per query and document clicks per query.

Although the precision of K+H-Sim is very close to K+S-Sim (Table 7), the normalized recall of K+H-Sim is always higher than K+S-Sim with a margin of about 10%. This shows that, when combined with keywords, the consideration of document hierarchy is helpful for increasing recall significantly without decreasing precision.

In order to compare the global quality of the four functions, we use the F-measure [van Rijsbergen 1979] as metric (in which the recall ratio is replaced by our normalized recall). Although the modified F-measure is different from the traditional one, it does provide some indication on the global quality of different similarity functions. Table 9 shows this evaluation.

We can see that between the threshold range of [0.5, 0.7], K+H-Sim and K+S-Sim are better than the single-criterion functions. Especially, when similarity threshold is equal to 0.6, K+H-Sim reaches the highest F-measure value (0.94).

All the above experiments show that it is beneficial to combine keywords and user document clicks in query clustering.

The Impact of Combination Parameters

To investigate the correlation between clustering results and the setting of parameters $\alpha$ and $\beta$, we tested three different combinations within K+S-Sim: 1) $\alpha=0.5$ and $\beta=0.5$; 2)$\alpha=0.67$ and $\beta=0.33$; 3)$\alpha=0.67$ and $\beta=0.33$. Table 10 shows the proportions of clustered queries for these three settings with respect to the similarity threshold (in comparison with the two single-criterion functions).

TABLE 9

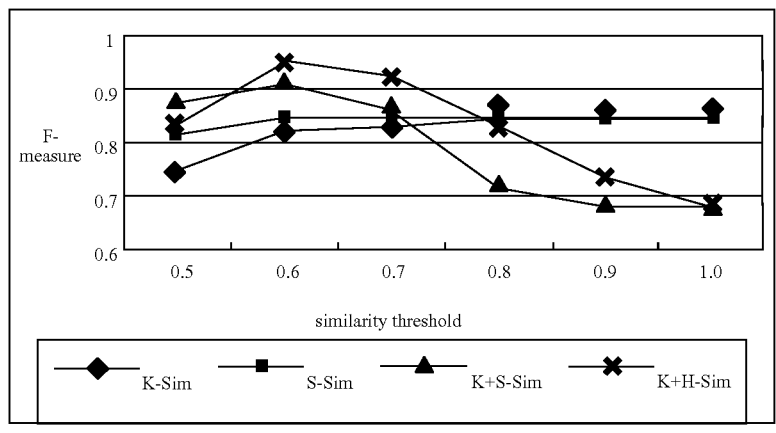

TABLE 10

Correlation Between Weights and Clustering Results

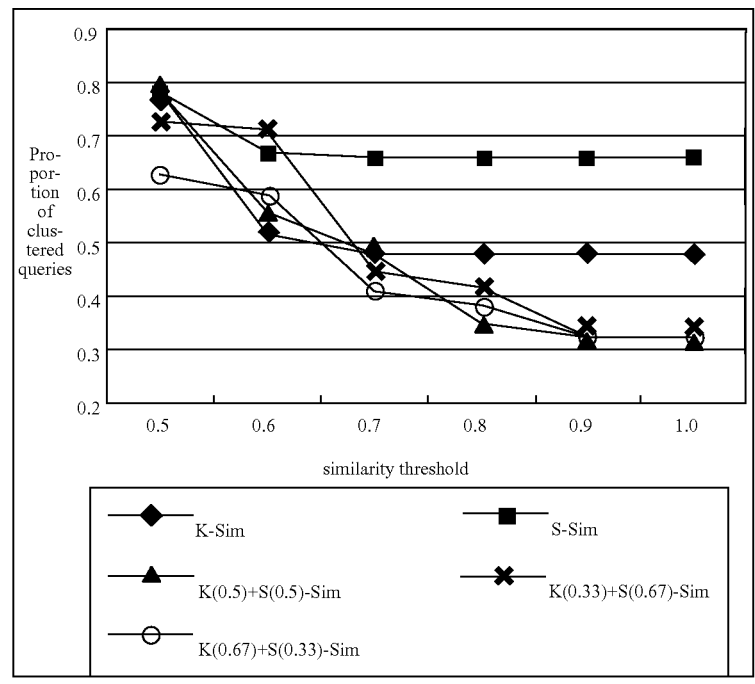

We observe that the setting influences the behavior of the algorithm to some extent. The general trend with respect to the threshold of all the three settings is similar—they decrease when the threshold is higher, and their change is larger than in the single-criterion cases. Between [0.5, 0.9], we do observe some difference among the three settings. This shows that the setting of the two parameters has a noticeable impact on the behavior of the clustering algorithm.

It is interesting to observe at some point (threshold=0.6) that when S-Sim and K-Sim are respectively supplemented by the other criterion, even more queries can be clustered. Therefore, the addition of a new criterion does not uniformly decrease the number of clustered queries.

This experiment shows that by varying the parameters $\alpha$ and $\beta$, we can obtain very different clustering results. This offers a certain flexibility to the editors in their exploration of the query sessions.

CONCLUSION

Although the system and procedure to cluster queries has been described in language specific to structural features and/or methodological operations, it is to be understood that the system and procedure to system and procedure to cluster queries defined in the appended claims is not necessarily limited to the specific features or operations described. Rather, the specific features and operations are disclosed as preferred forms of implementing the claimed present subject matter.

The invention claimed is:

1. A computer-implemented method for clustering queries, the method comprising:
   identifying a same document and/or similar documents selected by a user in response to queries, the similar documents being determined by evaluating a set of selected similar documents chosen responsive to queries p and q of the queries, wherein documents D_C(.) is a subset of a result list D(.) according to the following:

$D\_C(p) = \{d_{p1}, d_{p2}, \ldots, d_{pi}\} \subseteq D(p)$ $D\_C(q) = \{d_{q1}, d_{q2}, \ldots, d_{qj}\} \subseteq D(q)$ wherein similarity based on selection of documents is based on:
      If $D\_C(p) \cap D\_C(q) = \{d_{pq1}, d_{pq2}, \ldots, d_{pqk}\} \neq \emptyset$, then documents $d_{pq1}, d_{pq2}, \ldots, d_{pqk}$ represent a set of common topics of queries p and q, and,
   whereby the similar documents between queries p and q is determined by $D\_C(p) \cap D\_C(q)$; and
   responsive to identifying the same document and/or the similar documents, generating a query cluster to indicate queries p and q are similar independent of whether individual ones of the queries p and q comprise similar composition with respect to other ones of the queries.

2. The method of claim 1, wherein the queries comprise a well formed natural language question, a keyword, or a phrase.

3. The method of claim 1, wherein the query cluster is used to disambiguate a word or phrase in a query of the queries.

4. The method of claim 1, further comprising determining that the queries are similar based on similar keyword or phrase composition.

5. The method of claim 1, further comprising constructing a thesaurus comprising synsets, wherein each synset comprises one or more query clusters.

6. A computer-implemented method for clustering queries, the method comprising:

identifying a same document and/or similar documents selected by a user in response to queries, by determining the similar documents based on a proportionality of commonly selected individual documents as follows:

$$similarity_{single\_doc}(p, q) = \frac{RD(p, q)}{\text{Max}(rd(p), rd(q))},$$

wherein rd(.) is the number of clicked documents for a query of the queries, and wherein RD(p, q) is the number of document selections in common; and responsive to identifying the same document and/or the similar documents, generating a query cluster to identify similar queries of the queries independent of whether individual ones of the similar queries comprise analogous composition with respect to other ones of the similar queries.

7. A computer-implemented method for clustering queries, the method comprising:

identifying a same document and/or similar documents selected by a user in response to queries, the similar documents being based on a hierarchical positioning between individual ones of documents commonly selected across the queries, wherein $F(d_i, d_j)$ is a lowest common parent node for documents $d_i$ and $d_j$, wherein L(x) is a level of a node x, wherein L_Total identifies a total number of levels in a hierarchy, and wherein a similarity between two documents is defined as follows:

$$s(d_i, d_j) = \frac{L(F(d_i, d_j)) - 1}{L\_Total - 1},$$

wherein $s(d_i, d_j)=1$; and $s(d_i, d_j)=0$ if $F(d_i, d_j)$=root; incorporating $s(d_i, d_j)$ into a calculation of query similarity, wherein $d_i$ ($1 \leq i \leq m$) and $d_j$ ($1 \leq j \leq n$) be a set of selected documents for queries p and q respectively as follows:

$$similarity_{hierarchy}(p, q) = \frac{1}{2} \times \left( \frac{\sum_{i=1}^{m} \left( \max_{j=1}^{n} s(d_i, d_j) \right)}{rd(p)} + \frac{\sum_{j=1}^{n} \left( \max_{i=1}^{m} s(d_i, d_j) \right)}{rd(q)} \right);$$

and responsive to identifying the same document and/or the similar documents, generating a query cluster to indicate queries p and q are similar independent of whether individual ones of the queries p and q comprise similar composition with respect to other ones of the queries.

8. A computer-readable medium comprising computer-program instructions executable by a processor for identifying similar queries, the computer-program instructions comprising instructions for:

identifying a same document and/or similar documents selected by a user in response to queries, the similar documents being determined by evaluating a set of selected similar documents chosen responsive to queries p and q of the queries, wherein documents D_C(.) is a subset of a result list D(.) according to the following:

$$D\_C(p)=\{d_{p1}, d_{p2}, \ldots, d_{pi}\} \subseteq D(p)$$

$$D\_C(q)=\{d_{q1}, d_{q2}, \ldots, d_{qj}\} \subseteq D(q)$$

wherein similarity based on selection of documents is based on:

If $D\_C(p) \cap D\_C(q) = \{d_{pq1}, d_{pq2}, \ldots, d_{pqk}\} \neq \emptyset$, then documents $d_{pq1}, d_{pq2}, \ldots, d_{pqk}$ represent a set of common topics of queries p and q, and, whereby the similar documents between queries p and q is determined by $D\_C(p) \cap D\_C(q)$; and responsive to identifying the same document and/or the similar documents, generating a query cluster to indicate queries are similar independent of whether individual ones of the queries comprise similar composition with respect to other ones of the queries.

9. The computer-readable medium of claim 8, wherein the queries comprise a well formed natural language question, a keyword, or a phrase.

10. The computer-readable medium of claim 8, wherein the query cluster is used to disambiguate a word or phrase in a query of the queries.

11. The computer-readable medium of claim 8, wherein the computer-program instructions further comprise instructions for determining that the queries are similar based on similar keyword or phrase composition.

12. The computer-readable medium of claim 8, wherein the computer-program instructions further comprise instructions for constructing a thesaurus comprising synsets, wherein each synset comprises one or more query clusters.

13. A computers-readable medium comprising computer-program instructions executable by a processor for identifying similar queries, the computer-program instructions comprising instructions for:

identifying a same document and/or similar documents selected by a user in response to queries, the similar documents being determined based on a proportionality of commonly selected individual documents as follows:

$$similarity_{single\_doc}(p, q) = \frac{RD(p, q)}{\text{Max}(rd(p), rd(q))},$$

wherein rd(.) is the number of clicked documents for a query of the queries, and wherein RD(p, q) is the number of document selections in common; and responsive to identifying the same document and/or the similar documents, generating a query cluster to indicate queries are similar independent of whether individual ones of the queries comprise similar composition with respect to other ones of the queries.

14. A computer-readable medium comprising computer-program instructions executable by a processor for identifying similar queries, the computer-program instructions comprising instructions for:

identifying a same document and/or similar documents selected by a user in response to queries, the similar documents being based on a hierarchical positioning between individual ones of documents commonly selected across the queries, wherein $F(d_i, d_j)$ is a lowest common parent node for documents $d_i$ and $d_j$, wherein L(x) is a level of a node x, wherein L_Total identifies a total number of levels in a hierarchy, and wherein a similarity between two documents is defined as follows:

$$s(d_i, d_j) = \frac{L(F(d_i, d_j)) - 1}{L\_Total - 1},$$

wherein $s(d_i, d_j)=1$; and $s(d_i, d_j)=0$ if $F(d_i, d_j)=$root; incorporating $s(d_i, d_j)$ into a calculation of query similarity, wherein $d_i(1 \leq i \leq m)$ and $d_j(1 \leq j \leq n)$ be a set of selected documents for queries p and q respectively as follows:

$$similarity_{hierarchy}(p, q) = \frac{1}{2} \times \left( \frac{\sum_{i=1}^{m} \left( \max_{j=1}^{n} s(d_i, d_j) \right)}{rd(p)} + \frac{\sum_{j=1}^{n} \left( \max_{i=1}^{m} s(d_i, d_j) \right)}{rd(q)} \right);$$

and
responsive to identifying the same document and/or the similar documents, generating a query cluster to indicate similar queries independent of whether individual ones of the similar queries comprise similar composition with respect to other ones of the similar queries.

15. A computing device comprising:
a processor coupled to a memory, the memory comprising computer executable instructions, the processor being configured to fetch and execute the computer-executable instructions for:
identifying a same document and/or similar documents selected by a user in response to queries, the similar documents being determined by evaluating a set of selected similar documents chosen responsive to queries p and q of the queries, wherein documents $D\_C(.)$ is a subset of a result list $D(.)$ according to the following:

$$D\_C(p)=\{d_{p1}, d_{p2}, \ldots, d_{pi}\} \subseteq D(p)$$

$$D\_C(q)=\{d_{q1}, d_{q2}, \ldots, d_{qj}\} \subseteq D(q)$$

wherein similarity based on selection of documents is based on:
If $D\_C(p) \cap D\_C(q) = \{d_{pq1}, d_{pq2}, \ldots, d_{pqk}\} \neq \emptyset$, then documents $d_{pq1}, d_{pq2}, \ldots, d_{pqk}$ represent a set of common topics of queries p and q, and,
whereby the similar documents between queries p and q is determined by $D\_C(p) \cap D\_C(q)$; and
responsive to identifying the same document and/or the similar documents, generating a query cluster to indicate similar queries independent of whether individual ones of the queries comprise similar composition with respect to other ones of the queries.

16. The computing device of claim 15, wherein the queries comprise a well formed natural language question, a keyword, or a phrase.

17. The computing device of claim 15, wherein the query cluster is used to disambiguate a word or phrase in a query of the queries.

18. The computing device of claim 15, wherein the computer-executable instructions further comprise instructions for determining that the queries are similar based on similar keyword or phrase composition.

19. The computing device of claim 15, wherein the computer-executable instructions further comprise instructions for constructing a thesaurus comprising synsets, wherein each synset comprises one or more query clusters.

20. A computing device comprising:
a processor coupled to a memory, the memory comprising computer executable instructions, the processor being configured to fetch and execute the computer-executable instructions for:
identifying a same document and/or similar documents selected by a user in response to queries, the similar documents being determined based on a proportionality of commonly selected individual documents as follows:

$$similarity_{single\_doc}(p, q) = \frac{RD(p, q)}{\text{Max}(rd(p), rd(q))},$$

wherein $rd(.)$ is the number of clicked documents for a query of the queries, and wherein $RD(p, q)$ is the number of document selections in common; and
responsive to identifying the same document and/or the similar documents, generating a query cluster to indicate similar queries independent of whether individual ones of the similar queries comprise similar composition with respect to other ones of the similar queries.

21. A computing device comprising:
a processor coupled to a memory, the memory comprising computer executable instructions, the processor being configured to fetch and execute the computer-executable instructions for:
identifying a same document and/or similar documents selected by a user in response to queries, the similar documents being based on a hierarchical positioning between individual ones of documents commonly selected across the queries, wherein $F(d_i, d_j)$ is a lowest common parent node for documents $d_i$ and $d_j$, wherein $L(x)$ is a level of a node x, wherein $L\_Total$ identifies a total number of levels in a hierarchy, and wherein a similarity between two documents is defined as follows:

$$s(d_i, d_j) = \frac{L(F(d_i, d_j)) - 1}{L\_Total - 1},$$

wherein
$s(d_i, d_j)=1$; and $s(d_i, d_j)=0$ if $F(d_i, d_j)=$root; incorporating $s(d_i, d_j)$ into a calculation of query similarity, wherein, $d_i$ $(1 \leq i \leq m)$ and $d_j$ $(1 \leq j \leq n)$ be a set of selected documents for queries p and q respectively as follows:

$$similarity_{hierarchy}(p, q) = \frac{1}{2} \times \left( \frac{\sum_{i=1}^{m} \left( \max_{j=1}^{n} s(d_i, d_j) \right)}{rd(p)} + \frac{\sum_{j=1}^{n} \left( \max_{i=1}^{m} s(d_i, d_j) \right)}{rd(q)} \right);$$

and
responsive to identifying the same document and/or the similar documents, generating a query cluster to indicate similar queries independent of whether individual ones of the similar queries comprise similar composition with respect to other ones of the similar queries.

\* \* \* \* \*